(12) United States Patent  
Chiu

(10) Patent No.: US 7,679,204 B2
(45) Date of Patent: Mar. 16, 2010

(54) POWER DEVICE

(76) Inventor: Chih-Ho Chiu, No. 140-2, Jian-an Rd., Sansia Township, Taipei County (TW)

( * ) Notice: Subject to any disclaimer, the term of this patent is extended or adjusted under 35 U.S.C. 154(b) by 0 days.

(21) Appl. No.: 11/266,338

(22) Filed: Nov. 4, 2005

(65) Prior Publication Data
US 2007/0102929 A1 May 10, 2007

(51) Int. Cl.
F02B 63/04 (2006.01)
F02B 67/04 (2006.01)
F03G 7/08 (2006.01)

(52) U.S. Cl. ........................ 290/1 E; 290/1 R
(58) Field of Classification Search ........... 290/1 R, 290/1 E; 310/113; 369/264; 73/863; 360/96.3
See application file for complete search history.

(56) References Cited

U.S. PATENT DOCUMENTS 1,363,585 A * 12/1920 Haddow ............... 310/69
3,621,398 A * 11/1971 Willis ................. 340/293
4,287,428 A * 9/1981 Smith .................. 290/1 E
4,452,045 A * 6/1984 Matlin et al. .......... 60/641.8
4,524,283 A * 6/1985 Latvus ................. 290/1 E
6,784,561 B2 * 8/2004 Ootori ................. 290/1 R
2003/0160454 A1 * 8/2003 Manolis et al. ........ 290/1 R
2004/0041401 A1 * 3/2004 Trenchev et al. ....... 290/1 R
2004/0070208 A1 * 4/2004 Chiu .................. 290/1 R
2005/0248159 A1 * 11/2005 Seoane ............... 290/1 R

* cited by examiner

Primary Examiner—Julio Gonzalez
(74) Attorney, Agent, or Firm—Muncy, Geissler, Olds & Lowe, PLLC

(57) ABSTRACT

A turntable and a top-pushing rod, wherein said turntable is provided pivotally at equal interval along its peripheral direction with a plurality of rod bodies, and wherein said rod bodies are provided at their ends near the periphery of the turntable with heavy blocks, while said rod bodies are engaged at their front ends near the center of the turntable with a spring that has its other end engaged on the turntable, thereby the swinging of said rod bodies would drive springs to stretch or contract; wherein, said top-pushing rod is driven by a motor such that said top-pushing rod can move reciprocally along a linear direction in which it can push the heavy block on a rod body above said turntable so as to bring said heavy block returning to the highest position of the turntable.

7 Claims, 4 Drawing Sheets

US 7,679,204 B2

POWER DEVICE

BACKGROUND OF THE INVENTION

1. Field of the Invention

The invention relates to a power device that has a simple structure, can be operated conveniently and has low cost, characterized in that it takes advantage of a difference between left and right moments of force of a turntable to produce energy during its rotation.

2. Description of the Prior Art

Recently, as the risk of energy exhaustion on the earth is approaching, new electric power energy such as those produced by using wind, solar energy, hydraulic, or terrestrial heat has been developed constantly and actively throughout the whole world for the purpose of alleviating the combustion of the traditional energy sources.

However, any of those approaches by using wind, solar energy, hydraulic, or terrestrial heat described above has been restricted by regionalism in that, for example, those regions having lack of strong wind force throughout the year would be incapable to produce energy by means of wind force. Similarly, those regions having a plenty of rain throughout the year could not utilize naturally the solar energy. While those means using hydraulic force and terrestrial heat would mostly be occurred in exceptionally gifted areas. Accordingly, neither of those energy-producing means could be used in any regions in the whole world.

In view of the disadvantage that energy production by using natural forces is always limited to local regions, the inventor had study intensively in order to improve it, and develop, finally, a mechanical power device.

SUMMARY OF THE INVENTION

The main objective of the invention is to provide a power device that has a simple structure, can be operated conveniently and has low cost.

In order to achieve the above-mentioned objective, a power device provided by the invention comprises a turntable and a top-pushing rod, wherein said turntable is provided pivotally at equal interval along its peripheral direction with a plurality of rod bodies, and wherein said rod bodies are provided at their ends near the periphery of the turntable with heavy blocks, while said rod bodies are engaged at their front ends near the center of the turntable with a spring that has its other end engaged on the turntable, thereby the swinging of said rod bodies would drive the spring to stretch or contract; wherein, said top-pushing rod is driven by a motor such that said top-pushing rod can move reciprocally along a linear direction in which it can push the heavy block on a rod body above said turntable so as to bring said heavy block returning to the highest position of the turntable.

BRIEF DESCRIPTION OF THE DRAWINGS

These features and advantages of the present invention will be fully understood and appreciated from the following detailed description of the accompanying Drawings.

For deeper understanding, the invention is described in detail by way of an example hereinafter:

DETAILED DESCRIPTION OF THE PREFERRED EMBODIMENT

Figure 1:
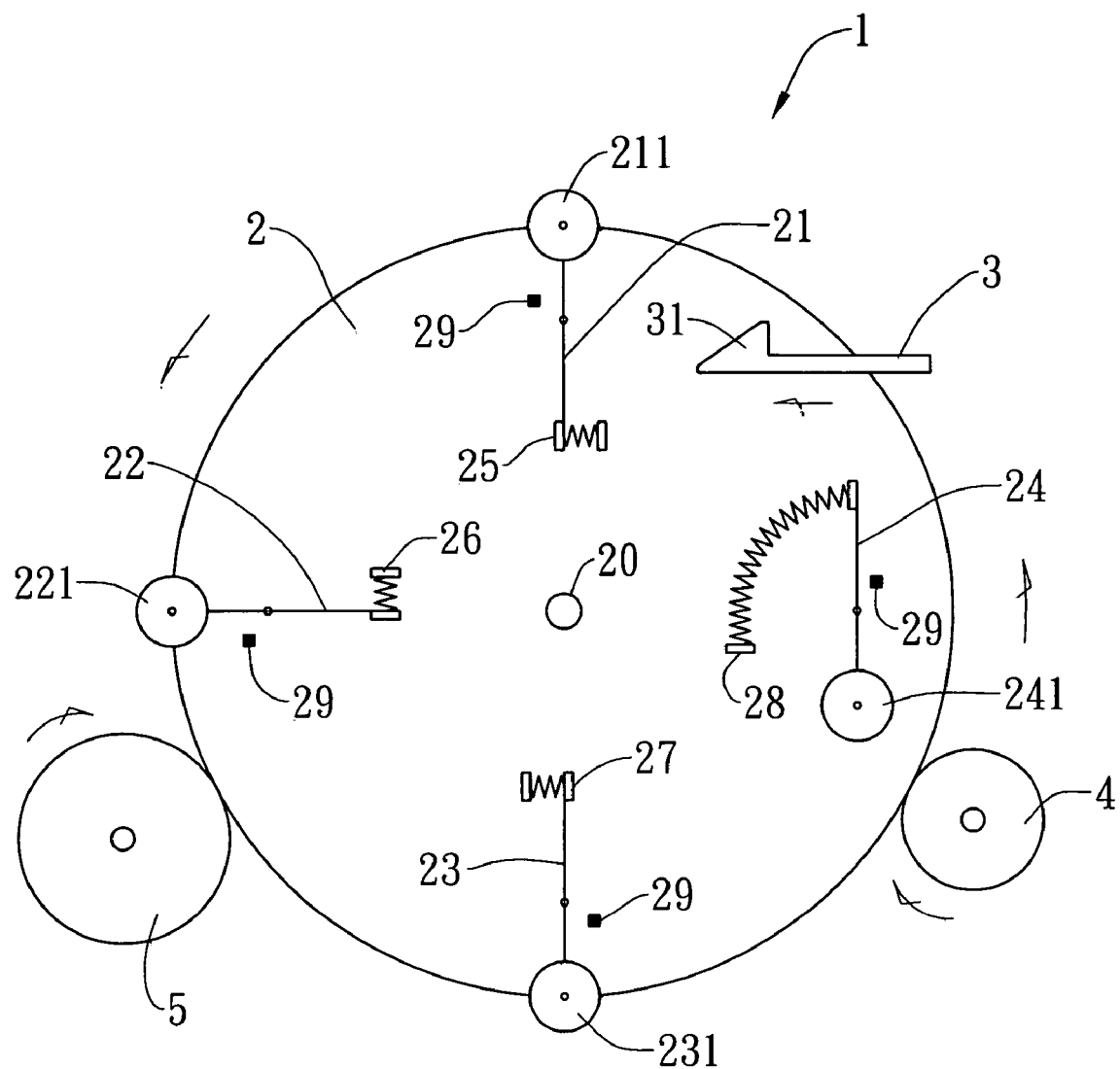
FIG. 1 is an external schematic view of a power device according to one embodiment of the invention.

Referring to FIG. 1, a power device 1 provided according to one embodiment of the invention is composed of a turntable 2 and a top-pushing rod 3.

Said turntable 2 is provided pivotally at equal interval along its peripheral direction with a plurality of rod bodies 21, 22, 23, and 24. Said rod bodies 21, 22, 23, and 24 are provided at their ends near the periphery of the turntable 2 with heavy blocks 211, 221, 231, and 241, while said rod bodies 21, 22, 23, and 24 are engaged at their front ends near the center of the turntable 2 respectively with springs 25, 26, 27, and 28 while each has its other end engaged on the turntable 2, thereby the swinging of said rod bodies 21, 22, 23, and 24 would drive the springs 25, 26, 27, and 28 to stretch or contract. Said turntable 2 is provided at its both lateral sides with a motor 4 and a generator 5 in a manner that the operation of said motor 4 can bring the rotation of said turntable 2, and the rotation of said turntable 2 can drive the action of said generator 5, whereas said motor 4 will stop operation immediately as soon as the turntable 2 rotates. In addition, said turntable 2 is provided thereon a stopping block 29 for preventing rod bodies 21, 22, 23, and 24 from shaking.

Said top-pushing rod 3 is shaped on its one end as a slant 31. Said top-pushing rod 3 is driven by a motor 4 such that said top-pushing rod 3 can move reciprocally along a linear direction in which it can push heavy blocks 211, 221, 231, and 241 on rod bodies 21, 22, 23, and 24 above said turntable 2 so as to bring said heavy blocks 211, 221, 231, and 241 returning to the highest position of the turntable 2.

In practice, as shown in FIG. 1-4, rod bodies 21, 22, 23, and 24 on said turntable 2 is provided in upper, lower, left and right direction relative to the center of said turntable 2, respectively. The distance from the end of the rod body 21 above said turntable 2 to the center of circle 20 of the turntable 2 is equal to the distance from the end of the rod body 23 below said turntable to the center of circle 20 of said turntable 2, while the distance from the end of the rod body 22 at the left side of said turntable 2 to the center of circle 20 of said turntable 2 is greater than the distance from the end of rod body 24 at the right side of said turntable 2, which end is nearest to the center of circle 20 of said turntable 2, to the center of circle 20 of said turntable 2. Further, the rod body 21 above said turntable 2 and the rod body 23 below said turntable 2 are disposed in a vertical position, while springs 25 and 27 above them is in a state of contraction. On the other hand, the rod body 22 at the left side of said turntable 2 is in a horizontal position, while the spring 26 on it is in a state of contraction. Furthermore, the rod body 24 at the right side of said turntable 2 is in a vertical position, while the spring 28 on it is in a state of stretching.

Figure 2:
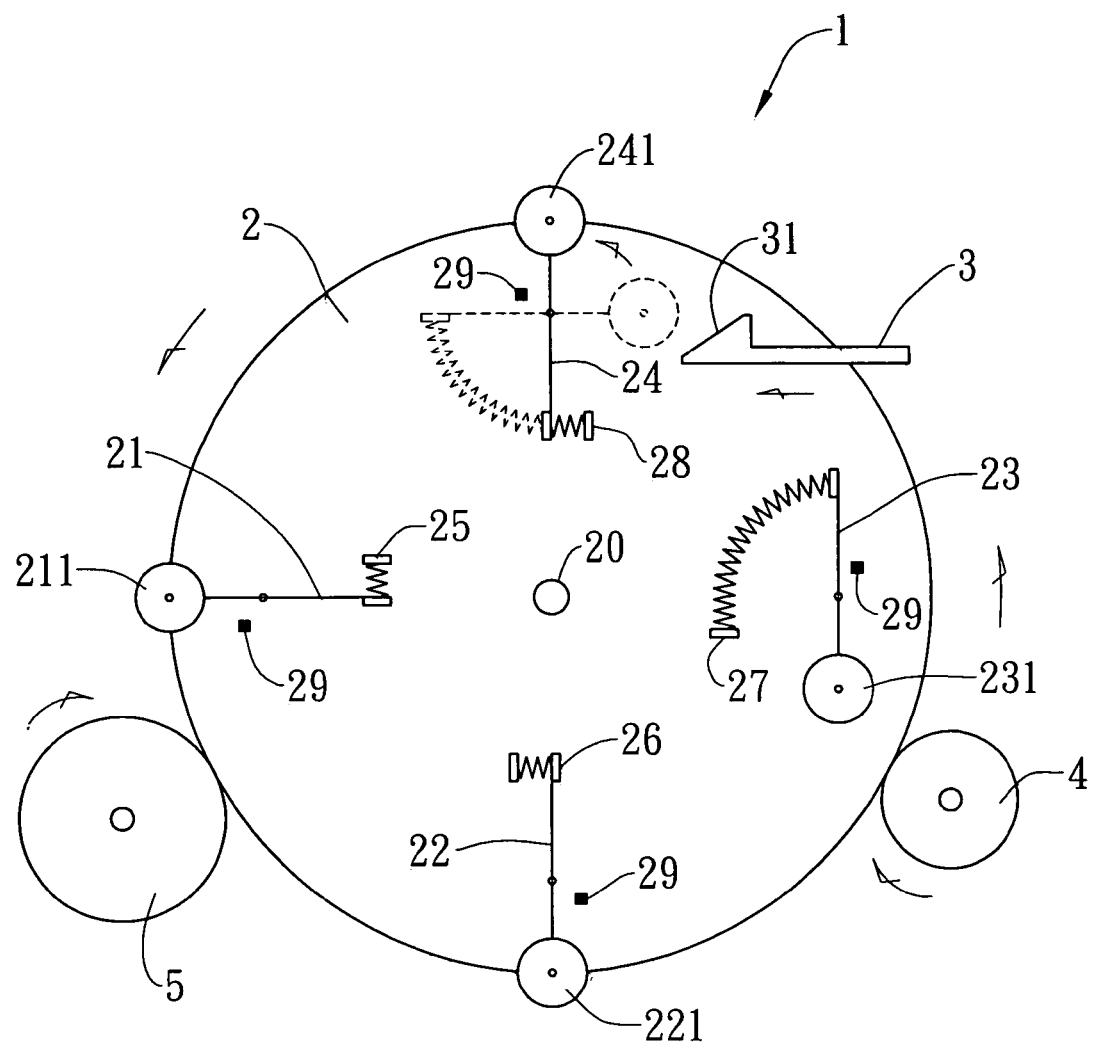
FIG. 2 is an external schematic view of a power device according to one embodiment of the invention after rotating 90 degree counterclockwise.

When the turntable 2 rotates counterclockwise, the rod body 21 above the turntable 2 would be driven to rotate to the left side of the turntable 2 in horizontal position (as shown in FIG. 2), and the spring 25 on it is in a state of contraction. At the same time, the rod body 22 disposed originally at the left side of the turntable 2 would be driven to rotate to the lower side of the turntable 2 in a vertical position, while the spring 26 on it is in a state of contraction. Further, the rod body 23 disposed originally in vertical position below the turntable 2 would be driven to rotate to the right side of the turntable 2 in vertical position, while the spring 27 on it would be in a state of stretching due to the vertical position of said rod body 23. Moreover, the rod body 24 disposed originally in vertical position at the right side of the turntable 2 would be driven to rotate to the upper side of the turntable 2 in vertical position. Meanwhile, said top-pushing rod 3 would be driven by a motor (not shown) in a manner that the top-pushing rod 3 might move reciprocally along a linear direction so as to push top to the heavy block 241 on the rod body 24 above the turntable 2, thereby the heavy block 241 would be returned to the highest position of the turntable 2, where said rod body 24 would be in vertical position to cause the originally stretched spring 28 becoming contracted.

Figure 3:
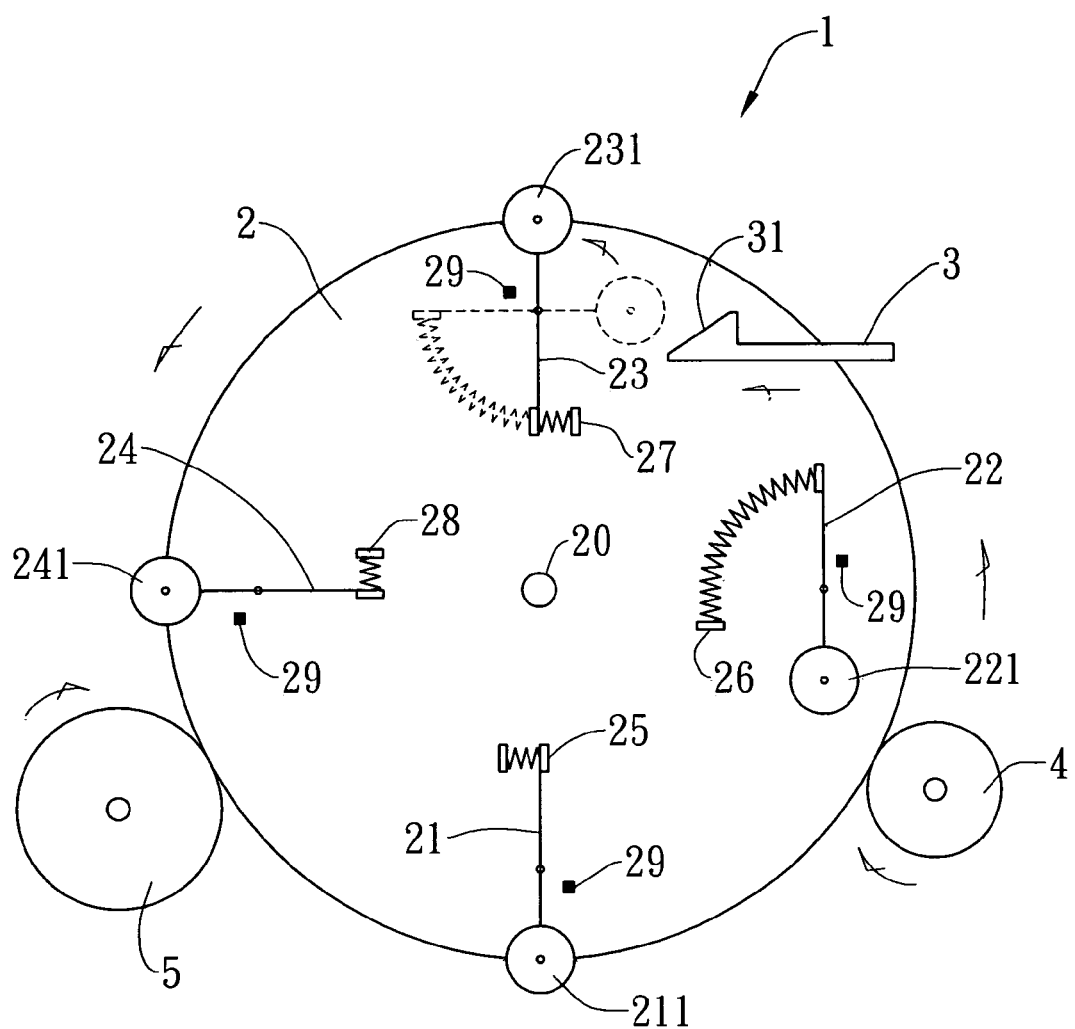
FIG. 3 is an external schematic view of a power device shown in FIG. 2 after rotating another 90 degree counterclockwise.
Figure 4:
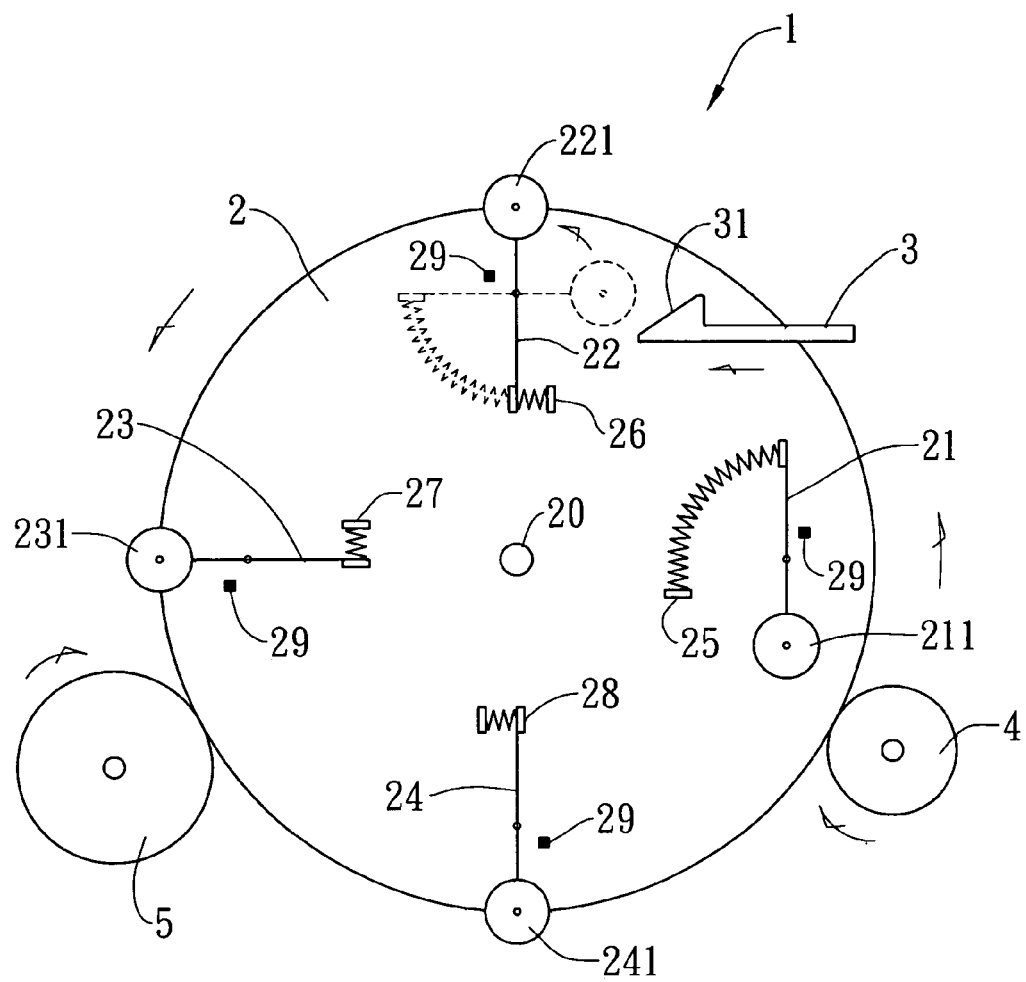
FIG. 4 is an external schematic view of a power device shown in FIG. 3 after rotating another 90 degree counterclockwise.

Accordingly, after the rod body 24 being driven to rotate to the upper side of the turntable 2, the moment of force at the left side of the turntable 2 will be greater than the moment of force at the right side of the turntable 2, thereby the turntable 2 could rotate counterclockwise continuously, and hence the above-described action would repeat (as shown in FIG. 2-4), whereby the rotation of the turntable 2 can bring out the action of the generator 5.

As illustrated with data, if the heavy block 211 of the rod body 21 is at a coordinate of (0, 5 m), the heavy block 221 of the rod body 22 is at a coordinate of (−5 m, 0), the heavy block 231 of the rod body 23 is at a coordinate of (0, −5 m), and the heavy block 241 of the rod body 24 is at a coordinate of (4.5 m, −0.5 m), and the weight of heavy blocks 211, 221, 231, and 241 is 1000 kg, the potential energy of the heavy block 211 becomes MGH=1000*9.8*5=49033 (joules), the potential energy of the heavy block 221 becomes MGH = 1000*9.8*0=0 (joules), the potential energy of the heavy block 231 becomes MGH=1000*9.8*(−5)=−49033 (joules), and the potential energy of the heavy block 241 becomes MGH=1000*9.8*(−0.5)=−4903 (joules), and the total potential energy becomes 49033+0+(49033)+(−4903)=−49030 (joules). As the turntable 2 rotates 90 degrees, i.e., the rod body 21 rotates from the upper side of the turntable 2 to the left side of the turntable 2, the coordinate of heavy block 211 changes to (5 m, 0), the coordinate of heavy block 221 changes to (0, −5 m), the coordinate of heavy block 231 changes to (4.5 m, −0.5 m), and the coordinate of heavy block 241 changes to (0, 5 m), the potential energy of the heavy block 211 becomes MGH=1000*9.8*0=0 (joules), the potential energy of the heavy block 221 becomes MGH=1000*9.8* (−5)=−49033 (joules), the potential energy of the heavy block 231 becomes MGH=1000*9.8*(−0.5)=−4903 (joules), and the potential energy of the heavy block 241 becomes MGH=1000*9.8*4.5=44129 (joules), and hence, the total potential energy becomes 0+(−49033)++(−4903)+44129=−9807 (joules). Accordingly, as the turntable 2 rotates 90 degree, a work of −4903−(−9807)=4904 (joules) could be produced while as the turntable 2 rotates 360 degree, a work of 4904*4=19616 (joules) could be produced.

The foregoing is intended to illustrate the practice of the invention, and in no way to limit the scope thereof. Many changes and modifications in the above-described embodiment of the invention can, of course, be carried out without departing from the scope thereof. The invention can thus achieve the intended objects by providing a power device that has a simple structure, can be operated conveniently and has a low cost, and therefore, exhibits industrial applicability. Accordingly, to promote the progress in science and the useful arts, the invention is disclosed and intended not to be limited only by the scope of the appended claims.

What is claimed is:

1. A power device for generating power, comprises:
   a turntable, provided pivotally at equal interval along its peripheral direction with a plurality of rod bodies, wherein said rod bodies are provided at their ends near the periphery of the turntable with heavy blocks, while said rod bodies are engaged at their front ends near the center of the turntable with a spring that has its other end engaged on the turntable, thereby the swinging of said rod bodies would drive the spring to stretch or contract; and
   a top-pushing rod, driven by a motor such that said top-pushing rod can move reciprocally along a linear direction in which it can push the heavy block on a rod body above said turntable so as to bring said heavy block returning to the highest position of the turntable, wherein said turntable is provided with four said rod bodies at the upper, lower, left and right sides of said turntable, respectively, wherein said rod bodies above and below said turntable is in vertical position, and springs above them is in a state of contraction; said rod body at the left side of said turntable is in horizontal position, and the spring on it is in a state of contraction; while the rod body at the right side of said turntable is in vertical position, and the spring on it is in a state of stretching, whereby, when said turntable rotates counterclockwise, the rod body above the turntable is driven to rotate to the left side of the turntable, and is in a horizontal position, and the spring on it is in a state of contraction, the rod body at the left side of the turntable is driven to rotate to the lower side of the turntable, and is in a vertical position, and the spring on it is in a state of contraction, the rod body originally in vertical position below the turntable is driven to the right side of the turntable and becomes in vertical position, and the spring on it becomes in a state of stretching due to the vertical position of said rod body, while the rod body originally in vertical position at the right side of the turntable is driven to rotate to the upper side of the turntable and is in a horizontal position, which becomes in a vertical position due to the top pushing of the heavy block by the top-pushing rod, thereby the originally stretched spring will become contracted, the power device further comprises a stopping block provided on said turntable to prevent said rod body from shaking.

2. The power device as in claim 1, wherein said turntable is connected to a motor in a manner that the operation of said motor can bring the rotation of said turntable, and wherein said motor will stop operation immediately as soon as the turntable rotates; said turntable is provided thereon a stopping block for preventing rod bodies from shaking.

3. The power device as in claim 1, wherein said turntable is connected to a generator in a manner that the rotation of said turntable can drive the action of said generator.

4. The power device as in claim 1, wherein the distance from the end of the rod body above said turntable to the center of circle of the turntable is equal to the distance from the end of the rod body below said turntable to the center of circle of said turntable, while the distance from the end of the rod body at the left side of said turntable to the center of circle of said turntable is greater than the distance from the end of rod body at the right side of said turntable, which end is nearest to the center of circle of said turntable, to the center of circle of said turntable.

5. The power device as in claim 1, wherein one end of said top-pushing rod is in a shape of a slant to facilitate the top pushing of said heavy block.

6. A power device for generating power, comprises:

a turntable, provided pivotally at equal interval along its peripheral direction with a plurality of rod bodies, wherein said rod bodies are provided at their ends near the periphery of the turntable with heavy blocks, while said rod bodies are engaged at their front ends near the center of the turntable with a spring that has its other end engaged on the turntable, thereby the swinging of said rod bodies would drive the spring to stretch or contract; and a top-pushing rod, driven by a motor such that said top-pushing rod can move reciprocally along a linear direction in which it can push the heavy block on a rod body above said turntable so as to bring said heavy block returning to the highest position of the turntable, wherein said turntable is connected to a motor in a manner that the operation of said motor can bring the rotation of said turntable, and wherein said motor will stop operation immediately as soon as the turntable rotates; said turntable is provided thereon a stopping block for preventing rod bodies from shaking.

7. A power device for generating power, comprises:

a turntable, provided pivotally at equal interval along its peripheral direction with a plurality of rod bodies, wherein said rod bodies are provided at their ends near the periphery of the turntable with heavy blocks, while said rod bodies are engaged at their front ends near the center of the turntable with a spring that has its other end engaged on the turntable, thereby the swinging of said rod bodies would drive the spring to stretch or contract; and a top-pushing rod, driven by a motor such that said top-pushing rod can move reciprocally along a linear direction in which it can push the heavy block on a rod body above said turntable so as to bring said heavy block returning to the highest position of the turntable, wherein one end of said top-pushing rod is in a shape of a slant to facilitate the top pushing of said heavy block.

* * * * *